US008670726B2

(12) United States Patent
Poulin

(10) Patent No.: US 8,670,726 B2
(45) Date of Patent: Mar. 11, 2014

(54) ARCHITECTURE FOR COEXISTENCE OF MULTIPLE BAND RADIOS

(75) Inventor: Grant Darcy Poulin, Carp (CA)

(73) Assignee: Microsemi Corporation, Aliso Viejo, CA (US)

(*) Notice: Subject to any disclaimer, the term of this patent is extended or adjusted under 35 U.S.C. 154(b) by 397 days.

(21) Appl. No.: 13/085,509

(22) Filed: Apr. 13, 2011

(65) Prior Publication Data
US 2012/0009886 A1 Jan. 12, 2012

Related U.S. Application Data

(60) Provisional application No. 61/362,349, filed on Jul. 8, 2010.

(51) Int. Cl.
H04B 1/44 (2006.01)
H04M 1/00 (2006.01)
H04B 1/00 (2006.01)
H04B 1/52 (2006.01)
H04B 7/08 (2006.01)
H04W 88/06 (2009.01)

(52) U.S. Cl.
CPC .............. *H04B 1/005* (2013.01); *H04B 1/0064* (2013.01); *H04B 1/525* (2013.01); *H04B 7/0825* (2013.01); *H04W 88/06* (2013.01)
USPC ......................................... 455/78; 455/553.1

(58) Field of Classification Search
CPC ...... H04B 1/005; H04B 1/0064; H04B 1/525; H04B 7/0825; H04W 88/06
USPC ................................................ 455/78, 553.1
See application file for complete search history.

(56) References Cited

U.S. PATENT DOCUMENTS 5,406,615 A * 4/1995 Miller et al. ................ 455/552.1
6,507,728 B1 * 1/2003 Watanabe et al. ............... 455/78
(Continued)

FOREIGN PATENT DOCUMENTS

EP 1220460 A2 12/2001
WO 01/06669 A1 1/2001
(Continued)

OTHER PUBLICATIONS

International Search Report for PCT/US2011/032200 issued Aug. 1, 2001 by European Patent Office.
(Continued)

Primary Examiner — Temesgh Ghebretinsae
Assistant Examiner — Devan Sandiford
(74) Attorney, Agent, or Firm — Simon Kahn

(57) ABSTRACT

A front end module for use with a first and a second radio frequency transceiver, constituted of: a control circuitry; a first antenna connection port; a second antenna connection port; a filter arranged to substantially attenuate the carrier frequency bandwidth of the second radio frequency transceiver; and a plurality of electronically controlled switches, wherein the control circuitry is arranged to: in the event that the first and second radio frequency transceivers are simultaneously operative, set the plurality of electronically controlled switches to connect the first radio frequency transceiver to one of the first and second antenna connection ports via the filter; and in the event that the first and second radio frequency transceivers are not simultaneously operative, set the plurality of electronically controlled switches to bypass the filter and connect the first radio frequency transceiver to one of the first and second antenna connection ports.

21 Claims, 6 Drawing Sheets

(56) References Cited

U.S. PATENT DOCUMENTS

| | | | |
|---|---|---|---|
| 6,567,653 B1* | 5/2003 | Sanders | 455/126 |
| 7,158,768 B2* | 1/2007 | Woo et al. | 455/179.1 |
| 8,089,906 B2* | 1/2012 | Poulin et al. | 370/280 |
| 8,204,451 B1* | 6/2012 | Kheirkhahi et al. | 455/84 |
| 8,208,867 B2* | 6/2012 | Lum et al. | 455/78 |
| 8,406,159 B2* | 3/2013 | Poulin et al. | 370/280 |
| 8,583,057 B2* | 11/2013 | Tu et al. | 455/82 |
| 2002/0086650 A1* | 7/2002 | Haapoja | 455/120 |
| 2002/0168956 A1* | 11/2002 | Murtojarvi | 455/296 |
| 2003/0081694 A1* | 5/2003 | Wieck | 375/316 |
| 2004/0018824 A1* | 1/2004 | Fang | 455/302 |
| 2004/0192222 A1* | 9/2004 | Vaisanen et al. | 455/78 |
| 2005/0136880 A1* | 6/2005 | Subasic et al. | 455/334 |
| 2005/0215204 A1* | 9/2005 | Wallace et al. | 455/78 |
| 2005/0227662 A1* | 10/2005 | Adachi et al. | 455/283 |
| 2007/0021059 A1* | 1/2007 | Karabinis et al. | 455/12.1 |
| 2007/0075803 A1* | 4/2007 | Kemmochi et al. | 333/132 |
| 2007/0082622 A1* | 4/2007 | Leinonen et al. | 455/78 |
| 2009/0061715 A1* | 3/2009 | Evans | 442/301 |
| 2010/0062721 A1* | 3/2010 | Le Guillou et al. | 455/67.11 |
| 2010/0202325 A1* | 8/2010 | Poulin et al. | 370/280 |
| 2010/0271957 A1 | 10/2010 | Stapleton et al. | |
| 2011/0045786 A1* | 2/2011 | Leinonen et al. | 455/78 |
| 2012/0009886 A1* | 1/2012 | Poulin | 455/78 |
| 2012/0171968 A1* | 7/2012 | Poulin et al. | 455/78 |
| 2012/0178386 A1* | 7/2012 | Pascolini et al. | 455/84 |
| 2013/0003783 A1* | 1/2013 | Gudem et al. | 375/140 |

FOREIGN PATENT DOCUMENTS

| | | |
|---|---|---|
| WO | 2004/088865 A1 | 10/2004 |
| WO | 2005/104390 A1 | 11/2005 |
| WO | WO 2008107812 A1 * 9/2008 | H04B 1/52 |

OTHER PUBLICATIONS

Written Opinion of the International Searching Authority for PCT/US2011/032200 issued Aug. 1, 2001 by European Patent Office.

* cited by examiner

FIG. 1C   *PRIOR ART*

| 2000 | PROVIDE FIRST, SECOND AND THIRD ANTENNA CONNECTION PORT |
|---|---|
| 2010 | PROVIDE FIRST, SECOND AND THIRD FILTER, OPTIONALLY BANDPASS, OPTIONALLY ONE OF SAW AND BAW, EACH ARRANGED TO PASS SIGNALS WITHIN BANDWIDTH OF CARRIER FREQUENCY OF ONE OF A FIRST AND SECOND RF TRANSCEIVER AND SUBSTANTIALLY ATTENUATE SIGNALS OF CARRIER FREQUENCY BANDWIDTH OF THE OTHER OF FIRST AND SECOND RF TRANSCEIVER |
| 2020 | PROVIDE PLURALITY OF ELECTRONICALLY CONTROLLED SWITCHES |
| 2030 | PROVIDE FIRST AND SECOND PA AND FIRST, SECOND AND THIRD LNA, SECOND ANTENNA CONNECTION PORT CONNECTED TO A FIRST RF TRANSCEIVER VIA SECOND LNA AND SECOND FILTER |
| 2040 | IN THE EVENT FIRST AND SECOND RF TRANSCEIVER SIMULTANEOUSLY OPERATIVE, WHEN FIRST RF TRANSCEIVER IS IN TRANSMIT MODE SET ELECTRONICALLY CONTROLLED SWITCHES TO CONNECT FIRST RF TRANSCEIVER TO FIRST ANTENNA CONNECTION PORT VIA FIRST PA AND FIRST FILTER |
| 2050 | IN THE EVENT FIRST AND SECOND RF TRANSCEIVER NOT SIMULTANEOUSLY OPERATIVE, WHEN FIRST RF TRANSCEIVER IS IN TRANSMIT MODE SET ELECTRONICALLY CONTROLLED SWITCHES TO CONNECT FIRST RF TRANSCEIVER TO FIRST ANTENNA CONNECTION PORT VIA FIRST PA, BYPASSING FIRST FILTER |
| 2060 | IN THE EVENT FIRST AND SECOND RF TRANSCEIVER SIMULTANEOUSLY OPERATIVE, WHEN FIRST RF TRANSCEIVER IS IN RECEIVE MODE SET ELECTRONICALLY CONTROLLED SWITCHES TO CONNECT FIRST ANTENNA CONNECTION PORT TO FIRST RF TRANSCEIVER VIA FIRST FILTER AND FIRST LNA |
| 2070 | WHEN SECOND RF TRANSCEIVER IS IN TRANSMIT MODE SET ELECTRONICALLY CONTROLLED SWITCHES TO CONNECT SECOND RF TRANSCEIVER TO THIRD ANTENNA CONNECTION PORT VIA SECOND PA AND THIRD FILTER |
| 2080 | WHEN SECOND RF TRANSCEIVER IS IN RECEIVE MODE SET ELECTRONICALLY CONTROLLED SWITCHES TO CONNECT THIRD ANTENNA CONNECTION PORT TO SECOND RF TRANSCEIVER VIA THIRD FILTER AND THIRD LNA |

FIG. 6

ARCHITECTURE FOR COEXISTENCE OF MULTIPLE BAND RADIOS

CROSS-REFERENCE TO RELATED APPLICATION

This application claims priority from U.S. Provisional Patent Application Ser. No. 61/362,349 filed Jul. 8, 2010, entitled "Optimized Architecture for Coexistence of WAN and WiFi Radios", the entire contents of which are incorporated herein by reference.

TECHNICAL FIELD

The present invention relates to the field of communication devices and more particularly to wireless communication devices exhibiting dual transceivers.

BACKGROUND

Cellular communication systems continue to grow in popularity and have become an integral part of both personal and business communications. Cellular telephones and similar devices allow users to place and receive phone calls almost anywhere they travel. Moreover, as the use of cellular telephone technology increases, so too has the functionality of cellular devices. For example, many cellular devices now incorporate Personal Digital Assistant (PDA) features such as calendars, address books, task lists, calculators, memo and writing programs, without limitation. These multi-function devices usually allow users to send and receive electronic mail messages wirelessly and access the internet via a long range wide area network (WAN), utilizing mobile network technology such as long term evolution (LTE) and WIMAX™, and/or via a short range wireless local area network (WLAN), for example, when the devices further include appropriate circuitry for WiFi™ and other IEEE 802.11™ standards. Each technology, when implemented, is provided with its own radio frequency (RF) transmission and reception frequencies, however the frequencies of the various technologies are often close together.

In a wireless communication device, if a plurality of communication technologies is supported, noise from one technology's radio can fall into the frequency band of another technology's radio, thus degrading operation. In further detail, if wideband noise from a WAN radio exhibits frequency components within the frequency band of the WLAN radio, significant degradation of the signal to noise ratio (SNR) in the receiver of the WLAN radio may occur during transmission by the WAN radio.

An example is illustrated in FIG. 1A. A communication device 10 comprising: a WAN transceiver 20; a first antenna 30; a power amplifier (PA) 40; a WLAN transceiver 50; a second antenna 60; and a low noise amplifier (LNA) 70. The output of WAN transceiver 20 is connected to the input of PA 40 and the output of PA 40 is connected to first antenna 30. WLAN transceiver 50 is connected to the output of LNA 70 and the input of LNA 70 is connected to second antenna 60. The wideband emissions emitted by PA 40 are radiated by first antenna 30, received by second antenna 60, amplified by LNA 70 and received as interference by WLAN transceiver 50. For simplicity only the transmit path of WAN transceiver 20 and the receive path of WLAN transceiver 50 is shown, however this is not meant to be limiting in any way. Additionally, WAN transceiver 20 may be provided with a plurality of receiving amplifier paths each connectable to one of a plurality of antennas so as to provide antenna diversity or multiple-input-multiple-output (MIMO), without exceeding the scope.

FIG. 1B illustrates the spectrum of the emissions of PA 40 with a 10 MHz bandwidth and operating with a power output of 23 dBm, where the x-axis represents frequency offset from the WAN center frequency and the y-axis represents emission power in dBm/MHz. In one embodiment, the center frequency of the WAN band is 2502 MHz and the uppermost channel of the WLAN frequency band is centered around 2462 MHz, i.e. only 40 MHz removed. As shown in curve 80, the emission power from PA 40 associated with WAN transceiver 20 is approximately −50 dBm/MHz at the WLAN center frequency. If, for example, the coupling factor of first antenna 30 to second antenna 60 is −15 dB, the resultant noise received by second antenna 60 at the center frequency of WLAN transceiver 50 is calculated as −50 dBm/MHz −15 dB=−65 dBm/MHz. When integrated over the 20 MHz passband of WLAN transceiver 50, the resultant noise level is −52 dBm. This will have a significant impact on the WLAN signal and will typically result in a 30-50 dB degradation in the sensitivity of WLAN transceiver 50, causing a significantly reduced range and throughput of the WLAN signal. Of course, this degradation only occurs when both the WAN and WLAN radios are operating simultaneously. However, this scenario can happen quite frequently, and is therefore a serious concern.

One potential solution to this problem is to place a filter 90 at the output of PA 40, as shown in communication device 10A of FIG. 1C, which is in all respects similar to communication device 10 with addition of filter 90, implemented as a very sharp bandpass filter, connected between the output of PA 40 and first antenna 30. Filter 90 passes the desired carrier bandwidth of WAN transceiver 20 while providing substantial attenuation of the power emissions in the carrier bandwidth of WLAN transceiver 50. The term substantial attenuation means an attenuation of at least 30 dB, and preferably at least 40 dB. Filter 90 may be implemented as either a surface acoustic wave (SAW) filter, a bulk acoustic wave (BAW) filter or any filter exhibiting a substantial attenuation of the frequencies in the carrier bandwidth of WLAN transceiver 50. Disadvantageously, these implementations of filter 90 exhibit significant insertion loss. For example, the ACPF-7025 available from Avago Technologies of San Jose, Calif., is a BAW filter designed to pass signals in the WAN carrier band from 2.5-2.7 GHz and attenuate signals in the WLAN carrier band by approximately 40 dB, thus providing an appropriate implementation for filter 90. Unfortunately, the ACPF-7025 exhibits a nominal insertion loss of 2.4 dB, with a worst case insertion loss of 5 dB over temperature and frequency. Between 42%-68% of the power transmitted from PA 40 is therefore absorbed as heat in filter 90. Thus, either the transmit power radiating from first antenna 30 will be reduced, resulting in shorter range, or the transmit power of WAN transceiver 20 must be dramatically increased, resulting in degraded battery life.

The above has been described in relation to simultaneous operation of a WAN transceiver and a WLAN transceiver, however this is not meant to be limiting in any way. The above description is similar for simultaneous operation of any two transceivers operating on frequencies that may interfere with each other.

What is desired, and not supplied by the prior art, is a system and method for simultaneous operation of two transceivers without significant SNR degradation of one of the signals and without a large overall insertion loss.

SUMMARY

In view of the discussion provided above and other considerations, the present disclosure provides methods and apparatus to overcome some or all of the disadvantages of prior and present lighting circuits. Other new and useful advantages of the present methods and apparatus will also be described herein and can be appreciated by those skilled in the art.

This is provided in certain embodiments by a front end module for use with a first and a second RF transceiver operative at different respective carrier frequencies. In one embodiment, the first RF transceiver is a WAN transceiver and the second RF transceiver is a WLAN transceiver. The front end module includes a filter arranged to pass the carrier frequency of the WAN transceiver and substantially attenuate the carrier frequency of the WLAN transceiver. The front end module further includes an antenna connection port and a bypass path arranged to bypass the filter. During simultaneous operation of the WAN transceiver and the WLAN transceiver, the WAN transceiver is connected to the antenna connection port via the filter. During operation of the WAN transceiver in the absence of operation of the WLAN transceiver, the WAN transceiver is connected to the antenna connection port via the bypass path, thereby bypassing the filter.

Specifically, a front end module for use with a first and a second RF transceiver operative at different carrier frequencies is provided, the front end module comprising: a control circuitry in communication with each of the first transceiver and the second transceiver; a first antenna connection port; a second antenna connection port; a first filter arranged to pass the carrier frequency bandwidth of the first RF transceiver and substantially attenuate any signal of the carrier frequency bandwidth of the second RF transceiver; and a plurality of electronically controlled switches, each responsive to the control circuitry, wherein the control circuitry is arranged to: in the event that the first and second RF transceivers are simultaneously operative, set the plurality of electronically controlled switches to connect the first RF transceiver to one of the first antenna connection port and the second antenna connection port via the first filter; and in the event that the first and second RF transceivers are not simultaneously operative, set the plurality of electronically controlled switches to bypass the first filter and connect the first RF transceiver to one of the first antenna connection port and the second antenna connection port.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1C illustrates a high level schematic diagram of the front end module of FIG. 1A further comprising a filter, according to the prior art;

FIG. 6 illustrates a high level flow chart of a method of controlled filtering of a first RF transceiver useable simultaneously with a second RF transceiver, utilizing the front end module of FIG. 4.

DETAILED DESCRIPTION OF PREFERRED EMBODIMENTS

Figure 1A:
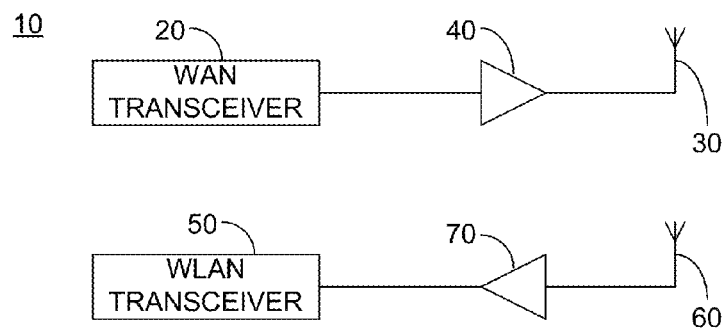
FIG. 1A illustrates a high level schematic diagram of a front end module for use with a WAN transceiver and a WLAN transceiver, according to the prior art.

Before explaining at least one embodiment in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. The term connected as used herein is not meant to be limited to a direct connection, and the use of appropriate resistors, capacitors, inductors and other active devices does not exceed the scope thereof.

The below embodiments will be detailed in relation to a WAN transceiver and a WLAN transceiver, however this is not meant to be limiting in any way, and is simply a particular example a pair of co-located transceivers having overlapping radiation frequencies. The below embodiments further illustrate antenna diversity in relation to a WAN transceiver, however this is not meant to be limiting in any way, and antenna diversity in relation to a WLAN transceiver may be provided without exceeding the scope.

Figure 1B:
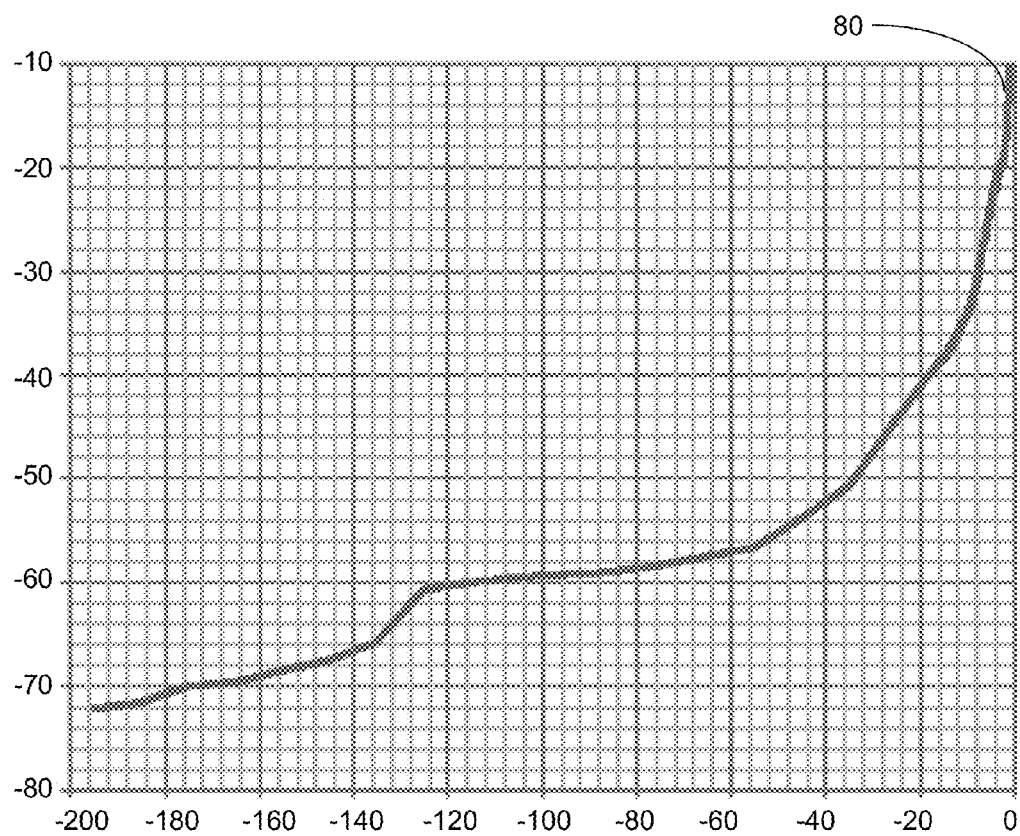
FIG. 1B illustrates a graph of the power emissions of a WAN power amplifier.
Figure 2:
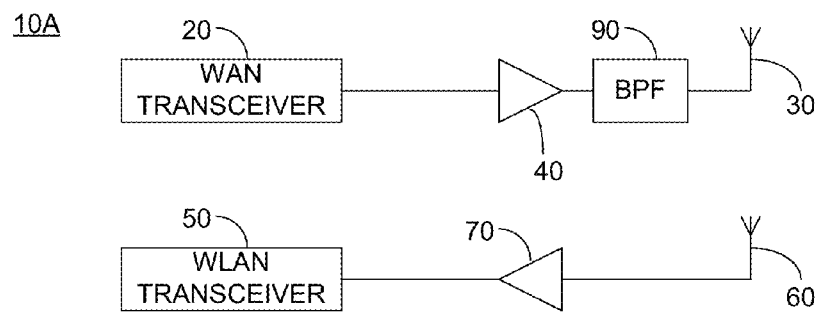
FIG. 2 illustrates a high level block diagram of an embodiment of a front end module for use with a first and a second RF transceiver operative at different carrier frequencies according to certain embodiments, particularly illustrating the transmit path of the first RF transceiver and the receive path of the second RF transceiver, the front end module comprising a bypass circuit.
Figure 2:
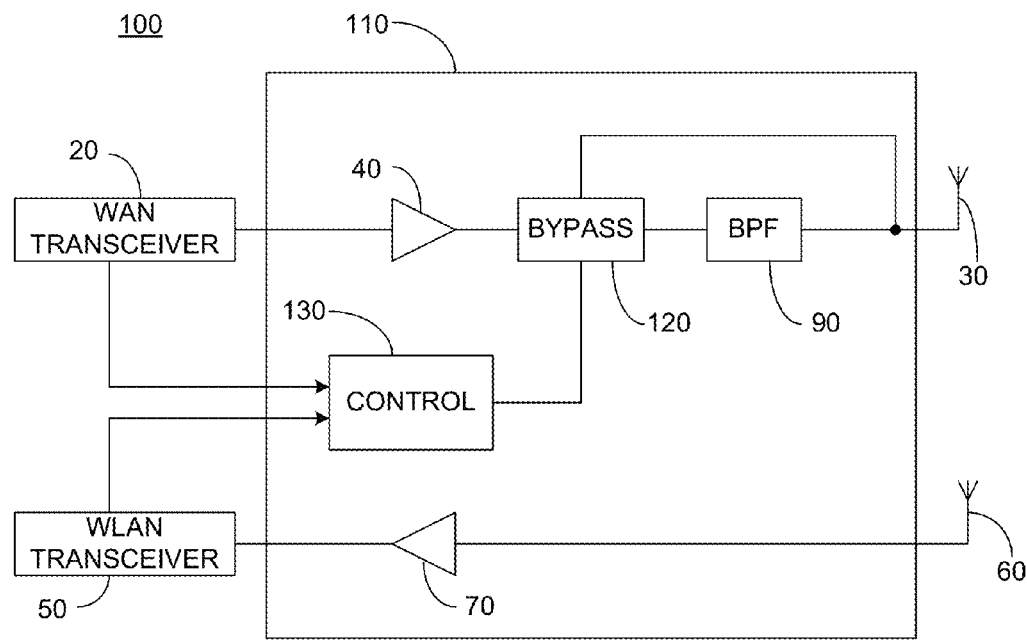

FIG. 2 illustrates a high level schematic diagram of a first embodiment of a front end module 110 for use with a communication device 100 communication device 100 comprising: a first RF transceiver 20, illustrated without limitation as WAN transceiver 20, a second RF transceiver 20, illustrated without limitation as WLAN transceiver 50, a first antenna 30 and a second antenna 60. Front end module 110, particularly illustrating the transmit path of WAN transceiver 20 and the receive path of WLAN transceiver 50, comprises: a PA 40; a LNA 70; a filter 90; a bypass circuitry 120; and a control circuitry 130. The operating carrier frequencies of WAN transceiver 20 and WLAN transceiver 50 preferably do not overlap, however they may be close to each other as described above in relation to FIG. 1B. In one embodiment, filter 90 is a bandpass filter arranged to pass the desired bandwidth of WAN transceiver 20 while providing substantial attenuation of frequencies in the desired bandwidth of WLAN transceiver 50. As described above, in one embodiment, filter 90 is one of a SAW filter and a BAW filter. In one embodiment, bypass circuitry 120 comprises a plurality of electronically controlled switches, as will be described below in relation to FIGS. 3 and 4.

The output of WAN transceiver 20 is connected to the input of PA 40 and the output of PA 40 is connected to an input of bypass circuitry 120. A first output of bypass circuitry 120 is connected to the input of filter 90 and the output of filter 90 is connected to first antenna 30. A second output of bypass circuitry 120 is connected to first antenna 130, thus bypassing filter 90. Second antenna 60 is connected to the input of LNA 70 and the output of LNA 70 is connected to the input of WLAN transceiver 50. A first input of control circuitry 130 is in communication with WAN transceiver 20, a second input of control circuitry 130 is in communication with WLAN transceiver 50 and an output of control circuitry 130 is connected to the control input of bypass circuitry 120.

In operation, when control circuitry 130 detects simultaneous operation of WAN transceiver 20 and WLAN transceiver 50, control circuitry 130 controls bypass circuitry 120 to connect the output of PA 40 to the input of filter 90 and disable the bypass path to first antenna 30. When control circuitry 130 does not detect simultaneous operation of WAN transceiver 20 and WLAN transceiver 50, control circuitry 130 controls bypass circuitry 120 to connect the output of PA 40 to first antenna 30, thus bypassing filter 90. In one embodiment, control circuitry 130 is set to determine simultaneous operation as simultaneous activity of WAN transceiver 20 and WLAN transceiver 50. In another embodiment, control circuitry 130 is set to determine simultaneous operation as transmission activity from WAN transceiver 20 and activity of WLAN transceiver 50. In yet another embodiment, control circuitry 130 is set to determine simultaneous operation as transmission activity from WAN transceiver 20 and reception activity of WLAN transceiver 50. Advantageously, when WLAN transceiver 50 is not receiving data, filter 90, which as described above exhibits substantial insertion loss, is bypassed. The overall insertion loss caused by filter 90 is thus substantially reduced, thereby allowing coexistence of a WAN transceiver 20 and WLAN transceiver 50 in communication device 100 without substantial overall power loss.

Disadvantageously, when simultaneous operation of WAN transceiver 20 and WLAN transceiver 50 is required, and bypass circuitry 120 is controlled to disable the bypass path to first antenna 30, the effective output power of PA 40 is decreased due to losses in filter 90, thus negatively impacting range. Alternatively, PA 40 may be provided so that it is capable of supplying the 3-5 dB additional power required to overcome any losses in filter 90. Unfortunately, PAs are typically not capable of achieving good efficiency over a wide range of output powers, and therefore the use of a PA 40 with the additional required gain will result in higher than desired power consumption when filter 90 is bypassed.

Figure 3:
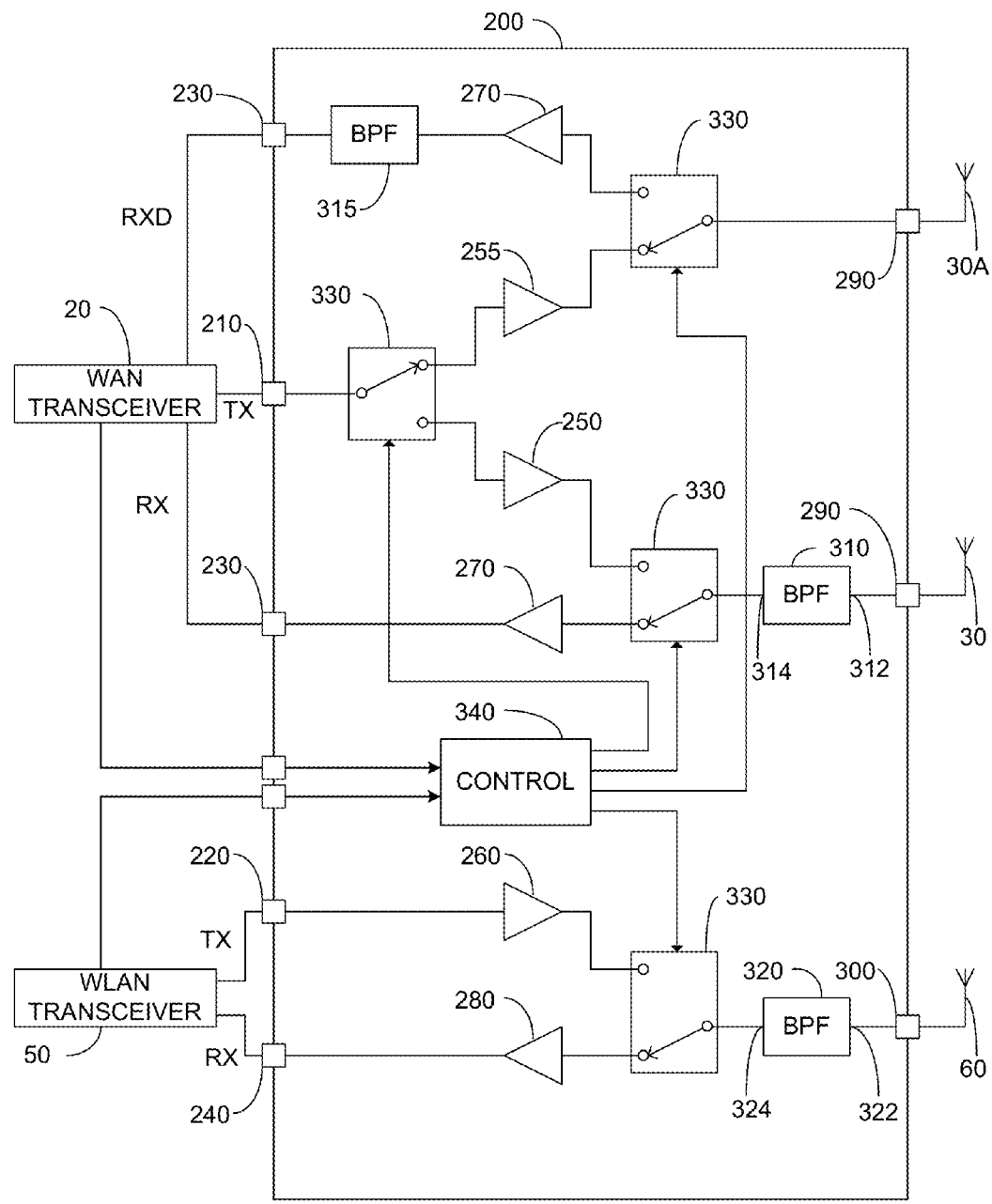
FIG. 3 illustrates a high level schematic diagram of a front end module for use with a first and a second RF transceiver operative at different carrier frequencies, according to certain embodiments, the front end module comprising a plurality of bandpass filters and a pair of power amplifiers each associated with a particular one of the various transmission paths alternately arranged for the first RF transceiver.

FIG. 3 illustrates a high level schematic diagram of an embodiment of a front end module 200 for use with a WAN transceiver 20, a WLAN transceiver 50, a first antenna 30, a second antenna 60 and a third antenna 30A, front end module 200 comprising: an WAN input port 210 connected to a transmission output port of WAN transceiver 20, the connection denoted TX; a WLAN input port 220 connected to a transmission output port of WLAN transceiver 50, the connection denoted TX; a first and a second WAN output port 230, each respectively connected to a first and a second receiving port of WAN transceiver 20, and denoted respectively RX and RXD; an WLAN output port 240 connected to a receiving port of WLAN transceiver 50 denoted RX; a WAN PA 250 and a WAN PA 255; a WLAN PA 260; a first and a second WAN LNA 270; a WLAN LNA 280; a first and a second WAN antenna connection port 290; a WLAN antenna connection port 300; a filter 310, exhibiting a first end 312 and a second end 314; a filter 315; a filter 320, exhibiting a first end 322 and a second end 324; a first, second, third and fourth electronically controlled switch 330; and a control circuitry 340.

PA 250 and PA 255 are each arranged to amplify transmit signals received from WAN transceiver 20, each being of the appropriate size, or gain, as will be described further below. First and second LNA 270 are each arranged to amplify received signals of the appropriate frequency for WAN transceiver 20. PA 260 is arranged to amplify transmit signals received from WLAN transceiver 50 and LNA 280 is arranged to amplify received signals of the appropriate frequency for WLAN transceiver 20. Filter 310 is a bandpass filter preferably arranged to pass signals of the carrier frequency bandwidth of WAN transceiver 20 while providing substantial attenuation of signals with frequencies in the carrier frequency bandwidth of WLAN transceiver 50. As described above in relation filter 90, the term substantial attenuation means attenuation of at least 30 dB. In another embodiment, the attenuation of filter 310 is at least 40 dB. In one embodiment, filter 310 is one of a SAW filter and a BAW filter. Filter 315 is a bandpass filter preferably arranged to pass signals of the carrier frequency bandwidth of received signals for WAN transceiver 20 while providing substantial attenuation of signals with frequencies in the carrier frequency bandwidth of WLAN transceiver 50. Filter 320 is a bandpass filter preferably arranged to pass signals of the carrier frequency bandwidth of WLAN transceiver 50 while providing substantial attenuation of signals with frequencies in the carrier frequency bandwidth of WAN transceiver 20. In one non-limiting embodiment, each of first, second, third and fourth electronically controlled switches 330 comprise a single pole, double throw (SPDT) switch. First and third antennas 30, 30A are preferably arranged to be responsive to signals of the carrier frequency of WAN transceiver 20, first antenna 30 is connected to first WAN antenna connection port 290 and third antenna 30A is connected to second WAN antenna connection port 290. Second antenna 60 is connected to WLAN antenna connection port 300 and is preferably arranged to be responsive to signals of the carrier frequency of WLAN transceiver 50.

A pole terminal of first electronically controlled switch 330 is connected to WAN input port 210, a first contact terminal of first electronically controlled switch 330 is connected to the input of PA 250 and a second contact terminal of first electronically controlled switch 330 is connected to the input of PA 255. First end 312 of filter 310 is connected to first WAN antenna connection port 290. A pole terminal of second electronically controlled switch 330 is connected to second end 314 of filter 310, a first contact terminal of second electronically controlled switch 330 is connected to the output of PA 250 and a second contact terminal of second electronically controlled switch 330 is connected to the input of first LNA 270. The output of first LNA 270 is connected to first WAN output port 230. A pole terminal of third electronically controlled switch 330 is connected to second WAN antenna connection port 290, a first contact terminal of third electronically controlled switch 330 is connected to the input of second LNA 270 and a second contact terminal of third electronically controlled switch 330 is connected to the output of PA 255. The output of second PA 270 is connected to a first end of filter 315 and a second end of filter 315 is connected to second WAN output port 230. In one alternate embodiment (not shown), filter 315 is connected between the input of second LNA 270 and the first contact terminal of third electronically controlled switch 330.

First end 322 of filter 320 is connected to WLAN antenna connection port 300. A pole terminal of fourth electronically controlled switch 330 is connected to second end 324 of filter 320, a first contact terminal of fourth electronically controlled switch 330 is connected to the input of PA 280 and a second contact terminal of fourth electronically controlled switch 330 is connected to the output of PA 260. The output of LNA 280 is connected to WLAN output port 240 and the input of PA 260 is connected to WLAN input port 220. A control input of each of first, second, third and fourth electronically controlled switches 330 is connected to a respective output of control circuitry 340. In one embodiment (not shown), a respective output of control circuitry 340 is connected to the control input of each of PA 250 and PA 255. A first input of control circuitry 340 is in communication with WAN transceiver 20 and a second input of control circuitry 340 is in communication with WLAN transceiver 50.

In operation, in the event that control circuitry 340 detects simultaneous operation of WAN transceiver 20 and WLAN transceiver 50, and further detects that WAN transceiver 20 is operating in a transmit mode, control circuitry 340 outputs respective signals to first and second electronically controlled switches 330 so as to connect WAN input port 210 to the input of PA 250 and to further connect the output of PA 250 to first WAN antenna connection port 290 via filter 310. In one embodiment, control circuitry 340 is further arranged to enable PA 250. In one embodiment, control circuitry 340 is further arranged to disable PA 255, thus conserving power, since PA 255 is not utilized.

In the event that control circuitry 340 does not detect simultaneous operation of WAN transceiver 20 and WLAN transceiver 50, or optionally detects simultaneous operation of WAN transceiver 20 and WLAN transceiver 50 with WLAN transceiver 50 not in a transmit mode, control circuitry 340 outputs respective signals to first and third electronically controlled switches 330 so as to connect WAN input port 210 to the input of PA 255 and to further connect the output of PA 255 to second WAN antenna connection port 290, thus bypassing filter 310. In one embodiment, control circuitry 340 is further arranged to enable PA 255. In one embodiment, control circuitry 340 is further arranged to disable PA 250, thus conserving power, since PA 250 is not utilized.

Optionally, if transmit antenna diversity is desired, in the event that control circuitry 340 does not detect simultaneous operation of WAN transceiver 20 and WLAN transceiver 50, in one embodiment control circuitry 340 outputs respective signals to attempt transmission via alternately first WAN antenna connection port 290 and second WAN antenna connection port 290. In another embodiment, transmission is attempted simultaneously via first and second WAN antenna connection ports 290.

Advantageously, only PA 250 is arranged to pass its output signal via filter 310, and is thus is in one embodiment provided with appropriate gain to compensate for the insertion loss of filter 310 so that first antenna 30 and third antenna 30A receive signals of the same strength. Therefore, in one embodiment, PA 255 comprises a power amplifier exhibiting a gain smaller than the gain of PA 250. Further advantageously, the architecture of front end module 200 allows for transmit antenna diversity, as described above.

In the event that WAN transceiver 20 is in the receive mode, control circuitry 340 outputs respective signals to second and third electronically controlled switches 330 so as to connect first WAN antenna connection port 290 to the input of first LNA 270 via filter 310, and second WAN antenna connection port 290 to the input of second LNA 270. The output of first LNA 270 is received by WAN transceiver 20 via connection RX and the output of second LNA 270 is received by WAN transceiver 20 via connection RXD, thus providing antenna diversity.

In the event that control circuitry 340 detects that WLAN transceiver 50 is operating in a transmit mode, control circuitry 340 outputs a respective signal to fourth electronically controlled switch 330 so as to connect the output of PA 260 via filter 320 to WLAN antenna connection port 300. In the event that control circuitry 340 detects that WLAN transceiver 50 is operating in a receive mode, control circuitry 340 outputs a respective signal to fourth electronically controlled switch 330 so as to connect WLAN antenna connection port 300 to WLAN output port 240 via filter 320 and LNA 280.

Figure 4:
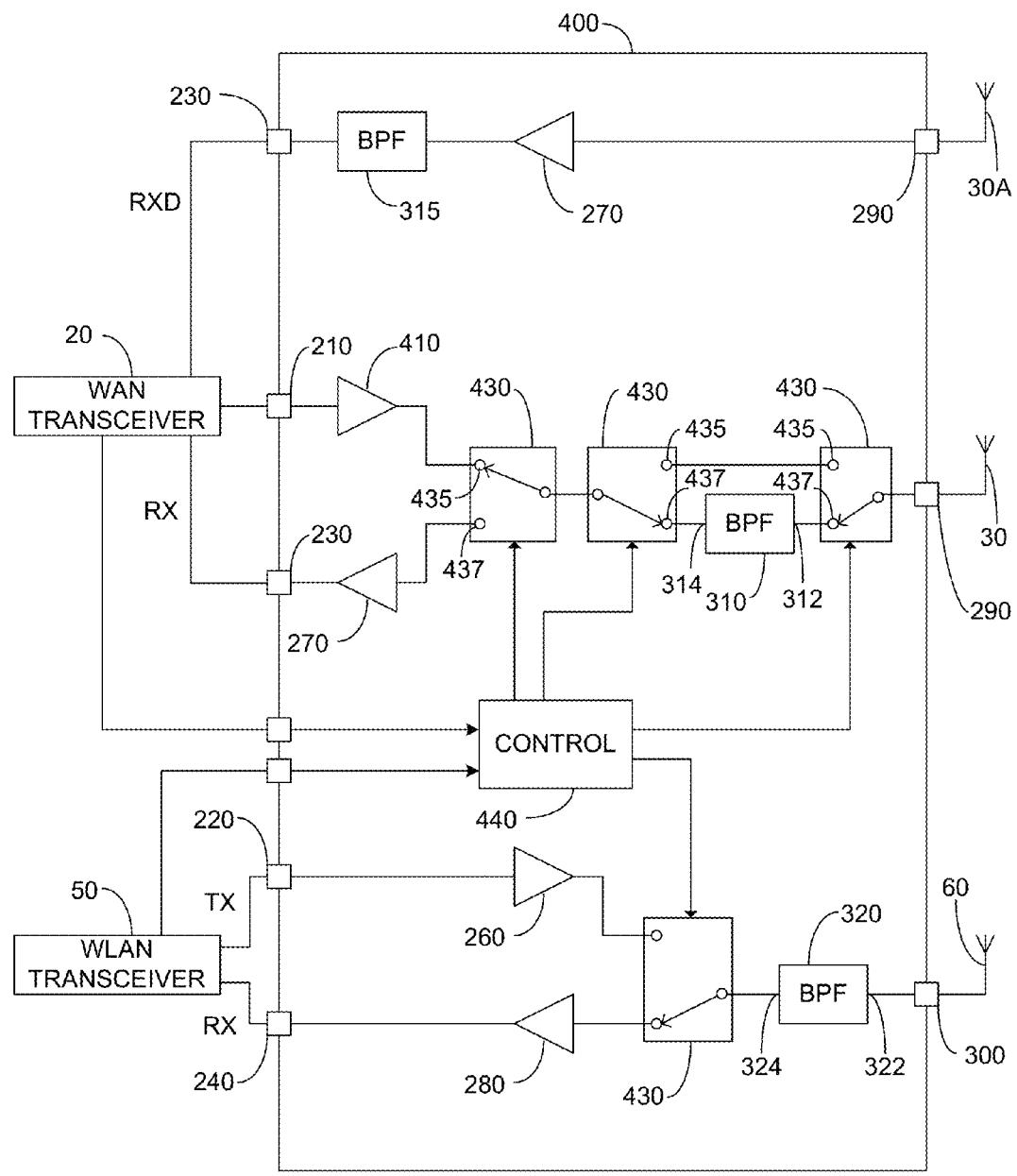
FIG. 4 illustrates a high level schematic diagram of a front end module for use with a first and a second RF transceiver operative at different carrier frequencies, according to certain embodiments, the front end module comprising a plurality of bandpass filters and a single power amplifier associated with each of the various transmission paths alternately arranged for the first RF transceiver.

FIG. 4 illustrates a high level schematic diagram of an embodiment of a front end module 400 for use with a WAN transceiver 20, a WLAN transceiver 50, a first antenna 30, a second antenna 60 and a third antenna 30A, front end module 400 comprising: an WAN input port 210 connected to a transmission output port of WAN transceiver 20, the connection denoted TX; a WLAN input port 220 connected to a transmission output port of WLAN transceiver 50, the connection denoted TX; a first and a second WAN output port 230, each respectively connected to a first and a second receiving port of WAN transceiver 20, the connections denoted respectively RX and RXD; a WLAN output port 240 connected to a receiving port of WLAN transceiver 50 the connection denoted RX; a PA 410; a WLAN PA 260; a first and a second WAN LNA 270; a WLAN LNA 280; a first and a second WAN antenna connection port 290; a WLAN antenna connection port 300; a filter 310, exhibiting a first end 312 and a second end 314; a filter 315; a filter 320, exhibiting a first end 322 and a second end 324; a first, second, third and fourth electronically controlled switch 430; and a control circuitry 440.

PA 410 is arranged to amplify transmit signals received from WAN transceiver 20, as described above in relation to PA 250, and first and second LNA 270 are each arranged to amplify signals received of the appropriate frequency for WAN transceiver 20. PA 260 is arranged to amplify transmit signals received from WLAN transceiver 50 and LNA 280 is arranged to amplify signals received of the appropriate frequency for WLAN transceiver 20. Filter 310 is a bandpass filter preferably arranged to pass signals of the carrier frequency bandwidth of WAN transceiver 20 while providing substantial attenuation of signals with frequencies in the carrier frequency bandwidth of WLAN transceiver 50. Filter 315 is a bandpass filter preferably arranged to pass signals of the carrier frequency bandwidth of received signals for WAN transceiver 20 while providing substantial attenuation of signals with frequencies in the carrier frequency bandwidth of WLAN transceiver 50. Filter 320 is a bandpass filter preferably arranged to pass signals of the carrier frequency bandwidth of WLAN transceiver 50 while providing substantial attenuation of signals with frequencies in the carrier frequency bandwidth of WAN transceiver 20. In one non-limiting embodiment, each of first, second, third and fourth electronically controlled switches 430 comprises a single pole, double throw (SPDT) switch. First and third antennas 30, 30A are preferably arranged to be responsive to signals of the carrier frequency of WAN transceiver 20, first antenna 30 is connected to first WAN antenna connection port 290 and third antenna 30A is connected to second WAN antenna connection port 290. Second antenna 60 is connected to WLAN antenna connection port 300 and is preferably arranged to be responsive to signals of the carrier frequency of WLAN transceiver 50.

The input of PA 410 is connected to WAN input port 210 and the output of PA 410 is connected to a first contact terminal 435 of first electronically controlled switch 430. First WAN output port 230 is connected to the output of first LNA 270 and the input of first LNA 270 is connected to a second contact terminal 437 of first electronically controlled switch 430. A pole terminal of first electronically controlled switch 430 is connected to a pole terminal of second electronically controlled switch 430. A first contact terminal 435 of second electronically controlled switch 430 is connected to a first contact terminal 435 of third electronically controlled switch 430. A second contact terminal 437 of second electronically controlled switch 430 is connected to second end 314 of filter 310, and first end 312 of filter 310 is connected to a second contact terminal 437 of third electronically controlled switch 430. A pole terminal of third electronically controlled switch 430 is connected to first WAN antenna connection port 290. The input of second LNA 270 is connected to second WAN antenna connection port 290, the output of second LNA 270 is connected to a first end of filter 315 and a second end of filter 315 is connected to second WAN output port 230.

First end 322 of filter 320 is connected to WLAN antenna connection port 300. A pole terminal of fourth electronically controlled switch 430 is connected to second end 324 of filter 320, a first contact terminal of fourth electronically controlled switch 430 is connected to the input of PA 280 and a second contact terminal of fourth electronically controlled switch 430 is connected to the output of PA 260. The output of LNA 280 is connected to WLAN output port 240 and the input of PA 260 is connected to WLAN input port 220. A control input of each of first, second, third and fourth electronically controlled switches 430 is connected to a respective output of control circuitry 440. In one embodiment (not shown), a respective output of control circuitry 440 is connected to the control input of PA 410. A first input of control circuitry 440 is in communication with WAN transceiver 20 and a second input of control circuitry 440 is in communication with WLAN transceiver 50.

In operation, in the event that control circuitry 440 detects simultaneous operation of WAN transceiver 20 and WLAN transceiver 50, and further detects that WAN transceiver 20 is operating in a transmit mode, control circuitry 440 outputs respective signals to first, second and third electronically controlled switches 430 so as to connect the output of PA 410 to first WAN antenna connection port 290 via filter 310. In particular, first electronically controlled switch 430 is set to connect the output of PA 410 to the pole terminal of second electronically controlled switch 430, second electronically controlled switch 430 is set to connect the output of PA 410 to second end 314 of filter 310 by connecting its pole terminal to second terminal 437, and third electronically controlled switch 430 is set to connect first end 312 of filter 310 to first antenna connection port 290 via its second terminal 437, thus connecting WAN input 210 to first antenna 30. In one embodiment, control circuitry 440 is further arranged to enable first PA 410, and optionally further set its gain to offset the insertion loss caused by filter 310.

In the event that control circuitry 340 does not detect simultaneous operation of WAN transceiver 20 and WLAN transceiver 50, and WAN transceiver 20 is in a transmit mode, control circuitry 440 outputs respective signals to first, second and third electronically controlled switches 430 so as to bypass filter 310, thus connecting the output of PA 410 to first WAN antenna connection port 290 without filter 310. In particular, first electronically controlled switch 430 is set to connect the output of PA 410 to the pole terminal of second electronically controlled switch 430, second electronically controlled switch 430 is set to connect its pole terminal to its first contact terminal 435, and third electronically controlled switch 430 is set to connect its pole terminal to its first contact terminal 435. In one embodiment, control circuitry 440 is further arranged to enable first PA 410, and optionally further set its gain to a value determined based on the absence of filter 310 in the transmit path. Unfortunately, transmit antenna diversity is not supported.

In the event that WAN transceiver 20 is in the receive mode, control circuitry 440 outputs respective signals to first, second and third electronically controlled switches 430 so as to connect first WAN antenna connection port 290 to first WAN output port 230 via filter 310 and first LNA 270, for ultimate connection to WAN transceiver 20 through connection RX. In particular, first electronically controlled switch 430 is set to connect its pole terminal to its second contact terminal 437, second electronically controlled switch 430 is set to connect its pole terminal to its second contact terminal 437, and third electronically controlled switch 430 is set to connect its pole terminal to its second contact terminal 437.

As described above, second WAN antenna connection port 290 is connected to WAN transceiver 20 via connection RXD, filter 315 and second LNA 270, thus achieving antenna diversity in the receive mode.

In the event that control circuitry 440 detects that WLAN transceiver 50 is operating in a transmit mode, control circuitry 440 outputs a respective signal to fourth electronically controlled switch 430 so as to connect the output of PA 260 via filter 320 to WLAN antenna connection port 300. In the event that control circuitry 440 detects that WLAN transceiver 50 is operating in a receive mode, control circuitry 440 outputs a respective signal to fourth electronically controlled switch 430 so as to connect second end 324 of filter 320 to the input of LNA 280, thereby connecting WLAN antenna connection port 300 to WLAN output port 240 via filter 320 and LNA 280.

Front end module 400 thus requires only a single PA 410 in the transmit path for WAN transceiver 20, but does not provide transmit antenna diversity. Additionally, in the event that PA 250 is not provided with a controllable gain, output signal strength varies responsive the operation of WLAN transceiver 50, as filter 310 is switched in, and out, of the transmit signal path. In particular, when simultaneous operation of WAN transceiver 20 and WLAN transceiver 50 is required, and control circuitry 440 sets first, second and third electronically controlled switches 430 to provide transmission via filter 310, the effective output power of PA 410 is decreased due to losses in filter 310, thus negatively impacting range. Alternatively, as indicated above, PA 410 may be provided with a variable gain so that it is capable of supplying the 3-5 dB additional power required to overcome any losses in filter 310. Unfortunately, PAs are typically not capable of achieving good efficiency over a wide range of output powers, and therefore the use of a PA 410 with the additional required gain will result in higher than desired power consumption when filter 310 is bypassed.

Figure 5:
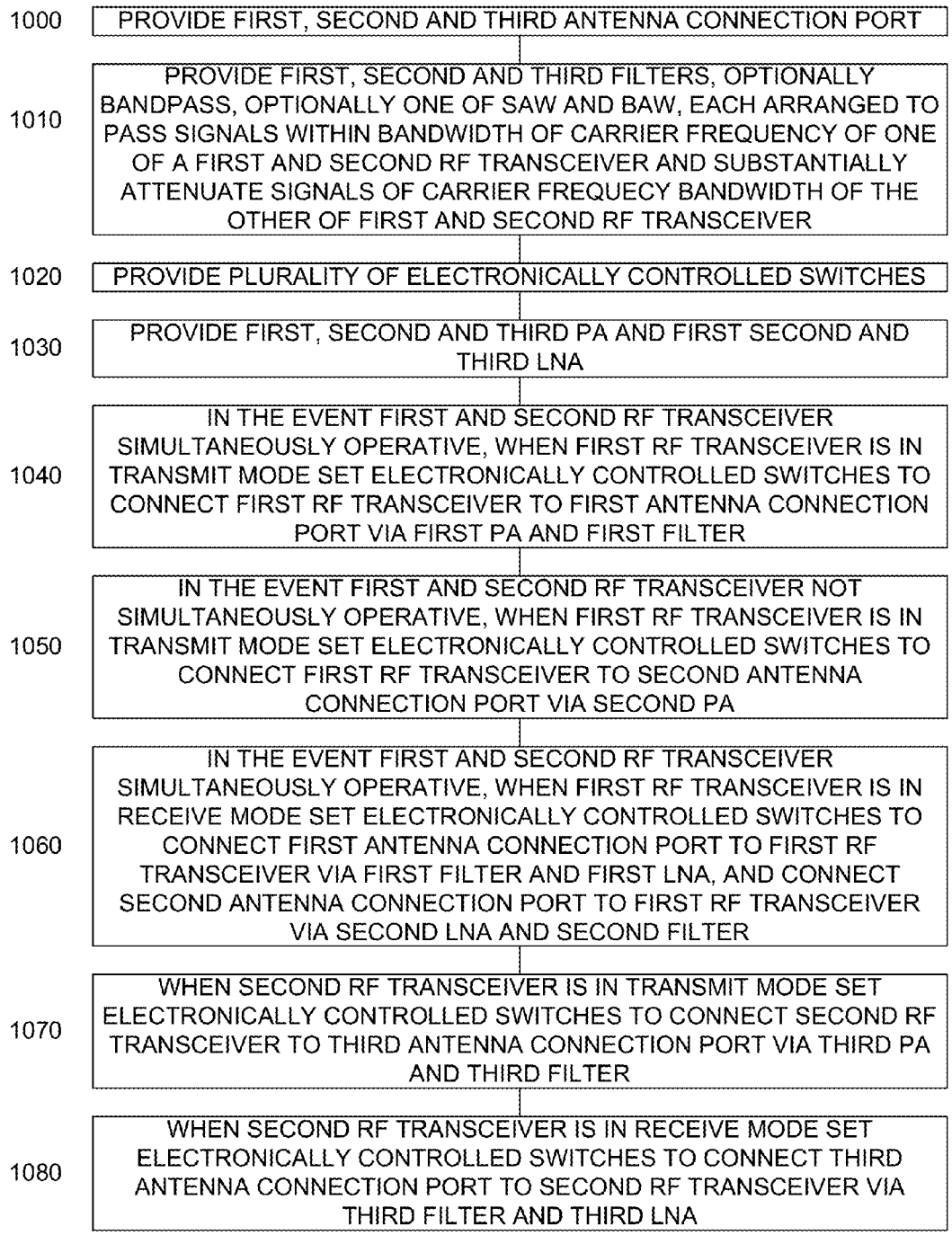
FIG. 5 illustrates a high level flow chart of a method of controlled filtering of a first RF transceiver useable simultaneously with a second RF transceiver, utilizing the front end module of FIG. 3.

FIG. 5 illustrates a high level flow chart of a method of controlled filtering of a first RF transceiver, such as WAN transceiver 20, useable simultaneously with a second RF transceiver, such as WLAN transceiver 50, utilizing front end module 200 of FIG. 3. In stage 1000 a first, second and a third antenna connection port are provided. In one embodiment, the provided first and second antenna connection ports are each connected to a respective antenna arranged to receive signals of an associated RF transceiver.

In stage 1010, a first, second and a third filter are provided. In one embodiment, one or more of the provided first, second and third filters are bandpass filters and in one further embodiment are each one of a SAW filter and a BAW filter.

In one embodiment, the first and second filters are each arranged to pass frequency components in the carrier frequency bandwidth of the first RF transceiver and substantially attenuate frequency components in the carrier frequency bandwidth of the second RF transceiver, and the third filter is arranged to pass frequency components in the carrier frequency bandwidth of the second RF transceiver and substantially attenuate frequency components in the carrier frequency bandwidth of the first RF transceiver. As described above, the term substantial attenuation means attenuation by at least 30 dB. In another embodiment, the attenuation is by at least 40 dB.

In stage 1020, a plurality of electronically controlled switches is provided. In stage 1030, a first, second and a third PA and a first second and a third LNA are provided. In one embodiment, the first and second PAs are arranged to amplify signals received from the first RF transceiver and the third PA is arranged to amplify signals received from the second RF transceiver. In one embodiment, the gain of the first PA is greater than the gain of the second PA, as described above in relation to PA 250 and PA 255. In one embodiment, the first and second LNAs are arranged to amplify frequency components in the carrier frequency bandwidth of the first RF transceiver and the third LNA is arranged to amplify frequency components in the carrier frequency bandwidth of the second RF transceiver.

In stage 1040, in the event that the first and second RF transceivers are simultaneously operative, when the first RF transceiver is in a transmit mode the provided plurality of electronically controlled switches of stage 1020 are set to connect the first RF transceiver to the first antenna connection port via the first PA and the first filter. In stage 1050, in the event that the first and second RF transceivers are not simultaneously operative, when the first RF transceiver is in a transmit mode the provided plurality of electronically controlled switches of stage 1020 are set to connect the first RF transceiver to the second antenna connection port via the second PA.

In stage 1060, in the event that the first and second RF transceiver are simultaneously operative, when first RF transceiver is in a receive mode the provided plurality of electronically controlled switches of stage 1020 are set to connect the first antenna connection port to the first RF transceiver via the first filter and the first LNA and further to connect the second antenna port to the first RF transceiver via the second LNA and the second filter.

In stage 1070, when the second RF transceiver is in a transmit mode the provided plurality of electronically controlled switches of stage 1020 are set to connect the second RF transceiver to the third antenna connection port via the third PA and the third filter. In stage 1080, when the second RF transceiver is in a receive mode the provided plurality of electronically controlled switches of stage 1020 are set to connect the third antenna connection port to the second RF transceiver via the third filter and the third LNA.

FIG. 6 illustrates a high level flow chart of a method of controlled filtering of a first RF transceiver, such as WAN transceiver 20, useable simultaneously with a second RF transceiver, such as WLAN transceiver 50, utilizing front end module 400 of FIG. 4. In stage 2000 a first, second and a third antenna connection port are provided. In one embodiment, the first and second antenna connection ports are each connected to a respective antenna arranged to receive signals of an associated RF transceiver.

In stage 2010, a first, second and a third filter are provided. In one embodiment, one or more of first, second and third filters are bandpass filters and in one further embodiment are each one of a SAW filter and a BAW filter. In one embodiment, the first and second filters are each arranged to pass frequency components in the carrier frequency bandwidth of the first RF transceiver and substantially attenuate frequency components in the carrier frequency bandwidth of the second RF transceiver, and the third filter is arranged to pass frequency components in the carrier frequency bandwidth of the second RF transceiver and substantially attenuate frequency components in the carrier frequency bandwidth of the first RF transceiver. As described above, the term substantial attenuation means attenuation by at least 30 dB. In another embodiment, the attenuation is by at least 40 dB.

In stage 2020, a plurality of electronically controlled switches is provided. In stage 2030, a first and a second PA and a first, second and a third LNA are provided. In one embodiment, the first PA is arranged to amplify signals received from the first RF transceiver and the second PA is arranged to amplify signals received from the second RF transceiver. In one embodiment, the first and second LNAs are arranged to amplify frequency components in the carrier frequency bandwidth of the first RF transceiver and the third LNA is arranged to amplify frequency components in the carrier frequency bandwidth of the second RF transceiver.

In stage 2040, in the event that the first and the second RF transceiver are simultaneously operative, when the first RF transceiver is in a transmit mode the provided plurality of electronically controlled switches of stage 2020 are set to connect the first RF transceiver to the first antenna connection port via the first PA and the first filter. In stage 2050, in the event that the first and the second RF transceiver are not simultaneously operative, when the first RF transceiver is in a transmit mode the provided plurality of electronically controlled switches of stage 2020 are set to connect the first RF transceiver to the first antenna connection port via the first PA, bypassing the first filter.

In stage 2060, in the event that the first and the second RF transceivers are simultaneously operative, when the first RF transceiver is in a receive mode the provided plurality of electronically controlled switches of stage 2020 are set to connect the first antenna connection port to the first RF transceiver via the first filter and the first LNA.

In stage 2070, when the second RF transceiver is in a transmit mode the provided plurality of electronically controlled switches of stage 2020 are set to connect the second RF transceiver to the third antenna connection port via the second PA and the third filter. In stage 2080, when the second RF transceiver is in a receive mode the provided plurality of electronically controlled switches of stage 2020 are set to connect the third antenna connection port to the second RF transceiver via the third filter and the third LNA.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

I claim:

1. A front end module for use with a first and a second radio frequency transceiver operative at different carrier frequencies, the front end module comprising:
a control circuitry in communication with each of the first transceiver and the second transceiver;
a first antenna connection port;
a second antenna connection port;
a third antenna connection port;
a first output port arranged to provide a first received signal to the first radio frequency transceiver;
a second output port arranged to provide a second received signal to the first radio frequency transceiver;
a third output port arranged to provide a received signal to the second radio frequency transceiver;
a first input port arranged to receive a transmit signal from the first radio frequency transceiver;
a second input port arranged to provide a transmit signal from the second radio frequency transceiver;
a first filter arranged to pass the frequency components in the carrier frequency bandwidth of the first radio frequency transceiver and substantially attenuate frequency components in the carrier frequency bandwidth of the second radio frequency transceiver; and
a plurality of electronically controlled switches, each responsive to said control circuitry,
wherein said control circuitry is arranged to:
in the event that said second transceiver is active, couple one of the second input port and the third output port to the second antenna port;
in the event that the first and second radio frequency transceivers are simultaneously operative, and said first radio frequency transceiver is in a transmit mode, set said plurality of electronically controlled switches to couple the first input port to said first antenna connection port via said first filter;
in the event that said first and second radio frequency transceivers are not simultaneously operative, and said first radio frequency transceiver is in a transmit mode, set said plurality of electronically controlled switches to bypass said first filter and couple the first input port to one of said first antenna connection port and said third antenna connection port; and
in the event said first radio frequency transceiver is in a receive mode, set said plurality of electronically controlled switches to couple said first antenna connection port to said first output port and couple said third antenna connection port to said second output port to thereby provide receive antenna diversity for said first radio frequency transceiver in the receive mode.

2. The front end module of claim 1, further comprising:
a first power amplifier,
wherein said control circuitry arrangement to couple said first input port to said first antenna connection port via said first filter in the event that the first and second radio frequency transceivers are simultaneously operative and said first radio frequency transceiver is in the transmit mode comprises:
set said plurality of electronically controlled switches to couple said first input port to said first antenna connection port via a serial combination of said first power amplifier and said first filter.

3. The front end module of claim 2, further comprising:
a second power amplifier,
wherein said control circuitry arrangement to couple the first radio frequency transceiver to one of said first antenna connection port and said third antenna connection port so as to bypass said first filter in the event that the first and second radio frequency transceivers are not simultaneously operative, and said first radio frequency transceiver is in the transmit mode, comprises:
couple said first input port to said third antenna connection port via said second power amplifier.

4. The front end module of claim 3, further comprising:
a first receive amplifier; and
a second receive amplifier,
wherein in the event that said first radio frequency transceiver is in the receive mode, and said first and second radio frequency transceivers are simultaneously operative, said control circuitry arrangement to couple said first antenna connection port to said first output port and couple said third antenna connection port to said second output port comprises:
couple said first antenna connection port to said first output port via a serial combination of said first filter and said first receive amplifier; and
couple said third antenna connection port to said second output port via said second receive amplifier.

5. The front end module of claim 4, further comprising:
a second filter arranged to pass the frequency components in the carrier frequency bandwidth of the first radio frequency transceiver and substantially attenuate frequency components in the carrier frequency bandwidth of the second radio frequency transceiver, said second filter arranged between the output of said second receive amplifier and said second output port.

6. The front end module of claim 5, further comprising:
a third power amplifier;
a third receive amplifier; and
a third filter arranged to pass frequency components in the carrier frequency bandwidth of the second radio transceiver and substantially attenuate frequency components in the carrier frequency bandwidth of the first radio transceiver, wherein said arrangement to couple one of the second input port and the third output port to the second antenna port, when said second transceiver is active, comprises:
when the second transceiver is in an active transmit mode, to set said plurality of electronically controlled switches to couple said second input port to said second antenna connection port via a serial combination of said third power amplifier and said third filter, and
when the second transceiver is in an active receive mode, to set said plurality of electronically controlled switches to couple said second antenna connection port to said third output port via a serial combination of said third receive amplifier and said third filter.

7. The front end module of claim 2,
wherein said coupling of the first input port to one of said first antenna connection port and said third antenna connection port so as to bypass said first filter in the event that the first and second radio frequency transceivers are not simultaneously operative and said first radio frequency transmitter is in the transmit mode comprises:
couple said first input port to said first antenna connection port via said first power amplifier without a serial connection of said first filter.

8. The front end module of claim 7, further comprising:
a first receive amplifier,
wherein said control circuitry arrangement to couple said first output port to said first antenna connection port in the event that the first and second radio frequency transceivers are simultaneously operative, and said first radio frequency transceiver is in the receive mode, comprises:
set said plurality of electronically controlled switches to couple said first antenna connection port to said first output port via a serial combination of said first filter and first receive amplifier.

9. The front end module of claim 8, further comprising:
a second receive amplifier coupled between said third antenna connection port and said second output port and arranged to amplify signals received at said third antenna connection port for said output of said second received signal to the first radio frequency transceiver.

10. The front end module of claim 9, further comprising a second filter arranged to pass the frequency components in the carrier frequency bandwidth of the first radio frequency transceiver and substantially attenuate frequency components in the carrier frequency bandwidth of the second radio frequency transceiver, said second filter arranged between the output of said second receive amplifier and said second output port.

11. The front end module of claim 10, further comprising:
a third power amplifier;
a third receive amplifier; and
a third filter arranged to pass frequency components in the carrier frequency bandwidth of the second radio transceiver and substantially attenuate frequency components in the carrier frequency bandwidth of the first radio transceiver,
wherein said control circuitry is further arranged, when the second transceiver is in an active transmit mode, to set said plurality of electronically controlled switches to couple said second input port to said third antenna connection port via a serial combination of said third power amplifier and said third filter, and
when the second transceiver is in an active receive mode, to set said plurality of electronically controlled switches to couple said third antenna connection port to said third output port via a serial combination of said third receive amplifier and said third filter.

12. The front end module of claim 1, wherein said first filter is a bandpass filter.

13. The front end module of claim 1, wherein said first filter is one of a surface acoustic wave filter and a bulk acoustic wave filter.

14. A method for controlled filtering of a first radio frequency transceiver useable simultaneously with a second radio frequency transceiver, the method comprising:
providing a first antenna connection port;
providing a second antenna connection port;
providing a third antenna connection port;
providing a first input port;
providing a second input port;
providing a first output port;
providing a second output;
providing a third output port;
when the first radio frequency transceiver is in a transmit mode:
receiving a transmit signal from the first radio frequency transceiver at said provided first input port,
in the event that the first and second radio frequency transceivers are simultaneously operative:
filtering said received transmit signal by passing frequency components of said amplified transmit signal which are in the carrier frequency bandwidth of the first radio frequency transmitter and substantially attenuating frequency components of said received transmit signal which are in the carrier frequency bandwidth of the second radio frequency transmitter; and
transmitting said filtered transmit signal via said provided first antenna connection port, and
in the event that the first and second radio frequency transceivers are not simultaneously operative:
transmitting said received transmit via one of said provided first and third antenna connection ports without filtering, and;
when the first radio frequency transceiver is in a receive mode:
receiving a first receive signal via said provided first antenna connection port and coupling said first received signal to the first radio frequency transceiver via said provided first output port; and
receiving a second receive signal via said provided third antenna connection port and coupling said second receive signal to the first radio frequency transceiver via said provided second output port, thereby providing antenna diversity for the first radio frequency transceiver in the receive mode.

15. The method of claim 14, further comprising:
providing a first power amplifier, and
in the event that the first and second radio frequency transceivers are simultaneously operative and the first radio frequency transceiver is in the transmit mode:
amplifying said received transmit signal in cooperation with said provided first power amplifier,
wherein said transmitting comprises passing said amplified filtered transmit signal to said provided first antenna connection port.

16. The method of claim 15, further comprising:
providing a second power amplifier;
in the event that the first and second radio frequency transceivers are not simultaneously operative and the first radio frequency transceiver is in the transmit mode:
prior to said transmitting, amplifying said received transmit signal in cooperation with said provided second power amplifier, wherein said transmitting comprises passing said amplified transmit signal to said provided second antenna connection port.

17. The method of claim 16, further comprising:
when the first radio frequency transceiver is in a is in the receive mode, the coupling of said first received signal to the first radio frequency transceiver via said provided first output port comprises:
  filtering said received first receive signal by passing frequency components of said received first receive signal which are in the carrier frequency bandwidth of the first radio frequency transceiver and substantially attenuating other frequency components of said received first receive signal;
  amplifying said filtered first receive signal; and
  passing said amplified first receive signal to the first radio frequency transceiver, and
the coupling of said second received signal to the first radio frequency transceiver via said provided second output port comprises:
  amplifying said second receive signal; and
  passing said amplified second receive signal to the first radio frequency transceiver via said provided second output port.

18. The method of claim 17, further comprising:
when the second transceiver is in a transmit mode:
  receiving a transmit signal from the second radio frequency transceiver;
  amplifying said received transmit signal;
  filtering said amplified transmit signal by passing frequency components of said amplified transmit signal which are in the carrier frequency bandwidth of the second radio frequency transmitter and substantially attenuating frequency components of said amplified transmit signal which are in the carrier frequency bandwidth of the first radio frequency transmitter; and
  passing said filtered transmit signal to said provided third antenna connection port, and
when the second transceiver is in a receive mode:
  receiving a third receive signal from said provided third antenna connection port;
  filtering said third receive signal by passing frequency components of said third receive signal which are in the carrier frequency bandwidth of the second radio frequency transmitter and substantially attenuating other frequency components of said third receive signal;
  amplifying said filtered third receive signal; and
  passing said amplified third receive signal to the second radio frequency transceiver.

19. The method of claim 15, further comprising:
in the event that the first and second radio frequency transceivers are not simultaneously operative and the first radio frequency transceiver is in the transmit mode:
  prior to said transmitting, amplifying said received transmit signal in cooperation with said provided first power amplifier,
  wherein said transmitting comprises passing said amplified transmit signal to said provided first antenna connection port.

20. The method of claim 19, further comprising:
when the second transceiver is in a transmit mode:
  receiving a transmit signal from the second radio frequency transceiver at said provided second input port;
  amplifying said received transmit signal;
  filtering said amplified transmit signal by passing frequency components of said amplified transmit signal which are in the carrier frequency bandwidth of the second radio frequency transmitter and substantially attenuating frequency components of said amplified transmit signal which are in the carrier frequency bandwidth of the first radio frequency transmitter; and
  passing said filtered transmit signal to said provided third antenna connection port,
when the second transceiver is in a receive mode:
  receiving a third receive signal from said provided second antenna connection port;
  filtering said third receive signal by passing frequency components of said third receive signal which are in the carrier frequency bandwidth of the second radio frequency transmitter and substantially attenuating other frequency components of said third receive signal;
  amplifying said filtered third receive signal; and
  passing said amplified third receive signal to the second radio frequency transceiver via said provided third output port.

21. The method of claim 14, further comprising:
providing one of a surface acoustic wave filter and a bulk acoustic wave filter, wherein said filtering is in cooperation with said provided filter.

* * * * *